Aug. 14, 1951 C. E. R. VAZIEUX ET AL 2,564,551
ROTARY CUTTING TOOL FOR THE FRAGMENTATION
OF WOOD AND OTHER FIBROUS SUBSTANCES
Filed July 9, 1947 3 Sheets-Sheet 1

INVENTORS
CHARLES E. R. VAZIEUX
LUCIEN H. PROUTEAU
BY
ATTY.

Aug. 14, 1951     C. E. R. VAZIEUX ET AL     2,564,551
ROTARY CUTTING TOOL FOR THE FRAGMENTATION
OF WOOD AND OTHER FIBROUS SUBSTANCES
Filed July 9, 1947     3 Sheets-Sheet 2

INVENTORS
CHARLES E. R. VAZIEUX
LUCIEN H. PROUTEAU
BY
ATTY.

Patented Aug. 14, 1951

2,564,551

UNITED STATES PATENT OFFICE 2,564,551

ROTARY CUTTING TOOL FOR THE FRAGMENTATION OF WOOD AND OTHER FIBROUS SUBSTANCES

Charles Eugène Roger Vazieux, Saint-Mandé, and Lucien Hippolyte Prouteau, Bagnolet, France Application July 9, 1947, Serial No. 759,750
In France July 12, 1946

12 Claims. (Cl. 241—293)

This invention relates to fragmenting tools and more particularly to milling cutters having circularly arranged teeth that are positioned angularly with respect to the body of the tool.

It is known that in numerous cases it is necessary or advantageous to reduce wood and other fibrous substances such as straw and other vegetable substances into small fragments of the nature of sawdust. This reduction to fragments is useful for the manufacture of various agglomerates. It is also advisable for facilitating the transport of the substance which is much less bulky in the reduced state than in the natural state.

This invention has for its object to provide a novel means which enables such fragmentation or reduction to fragments to be effected under optimum conditions.

Another object of the invention is to provide fragmenting tools which comprise a plurality of concentric toothed crowns which are vertically staggered relatively to one another in such a manner that the plane defined by the various rings of teeth which are radially and vertically staggered relatively to one another has a certain obliquity, for example 45°, with respect to the cutting plane. The obliquity of said plane which covers the successive rings of teeth may be the same as that of the teeth of each row or, on the contrary, it may be different. By operating in this manner, the fibres of the wood or other substance worked are only engaged each time over a very small portion of their height, so that they are cut into extremely small fragments by the successive teeth and the successive rows of teeth. Furthermore, with this feed of the work, the rotary tool can very quickly cut up a considerable height of the substance treated, thereby effecting an excellent output of work, taking into account the power consumed.

Another object of the invention is to provide tools and in particular milling cutters comprising one or a plurality of oblique rings of teeth, said teeth being cut integrally with or secured to the cutter, and also cutting devices comprising a block in which are clamped one or a plurality of circular band saws.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
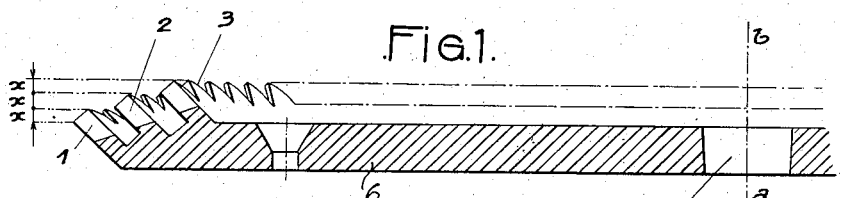
Fig. 1 is a partial vertical section along the line I—I of Fig. 2, of a milling cutter used according to the invention.
Figure 2:
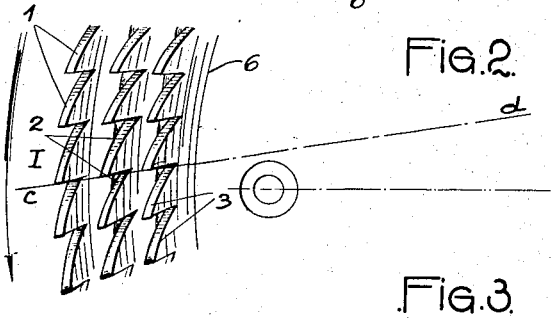
Fig. 2 is a corresponding partial plan view.
Figure 3:
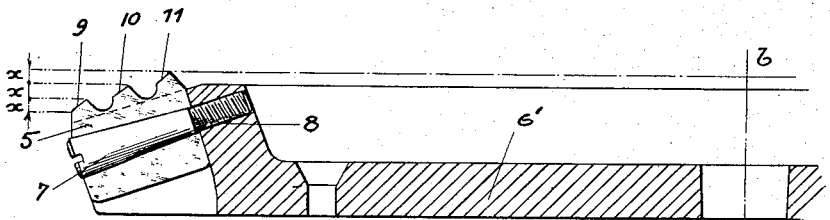
Fig. 3 is a partial vertical section along the line III—III of Fig. 4, showing a modified milling cutter.
Figure 4:
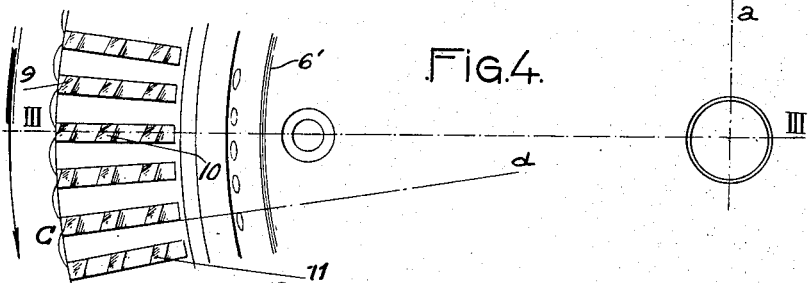
Fig. 4 is a corresponding partial plan view.

In Figs. 1, 3, 5, 6 and 7, $a$—$b$ designates the axis of rotation of the tools; and in Figs. 2 and 4, $c$—$d$ indicates the plane of the teeth.

According to Figs. 1 and 2, the milling cutter comprises three rows of oblique teeth 1, 2, 3, each of a vertical height $x$, carried by a disc 6. In these figures, said teeth are integral with the circular block, body, plate or cutter disc 6. The cutter body or disc shown provided with an outwardly inclined peripheral edge is mounted on a drive shaft by means of a hole 4.

According to Figs. 3 and 4, a plurality of segmental toothed elements 5 are secured to a circular body, plate or disc 6' having an upwardly and outwardly extending peripheral edge flange, by means of slightly conical studs 7 having screw-threaded portions 8 for removably securing the studs to said disc. Each toothed element comprises three rows of obliquely positioned teeth 9, 10, 11, with each of the teeth extending vertically for a height $x$.

In Figs. 1 and 2, the rows of teeth are staggered relatively to one another, the line $c$—$d$ passing three teeth, one of each row, positioned at an acute angle relative to the radius of the disc 6. In Figs. 1 to 4 the rows of teeth define an oblique plane intended to engage the substance to be reduced to fragments or disintegrated.

Figure 5:
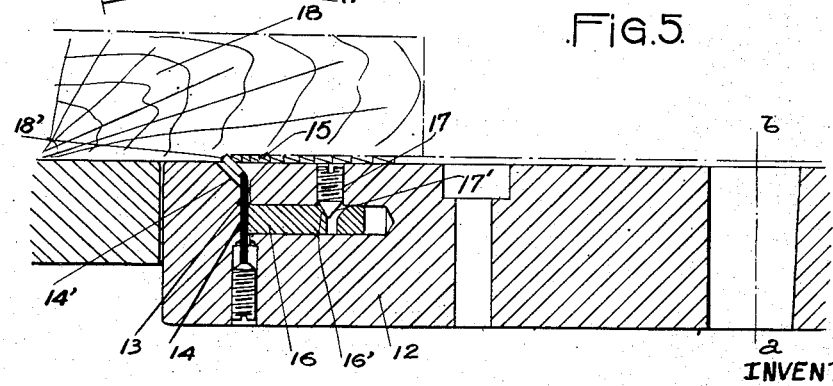
Fig. 5 is a partial vertical section of a block supporting a band-saw blade.

Fig. 5 shows another modification comprising a blade-holder 12 provided with a circular groove 13 in which is placed a band-saw 14 provided with teeth 15. The teeth 15 are bent over outwardly at an obtuse angle in an oblique portion 14' of the circular groove. The band 14 of the saw is securely held against the outer wall of the groove 13 by means of clamps 16 which are cammed outwardly by studs 17 provided with tapered ends 17' acting on an inclined surface 16' of a transverse hole provided in each of the clamps 16.

18 is a piece of wood to be reduced to fragments. It will be seen that the saw engages said piece of wood at 18', at a certain inclination.

Figure 6:
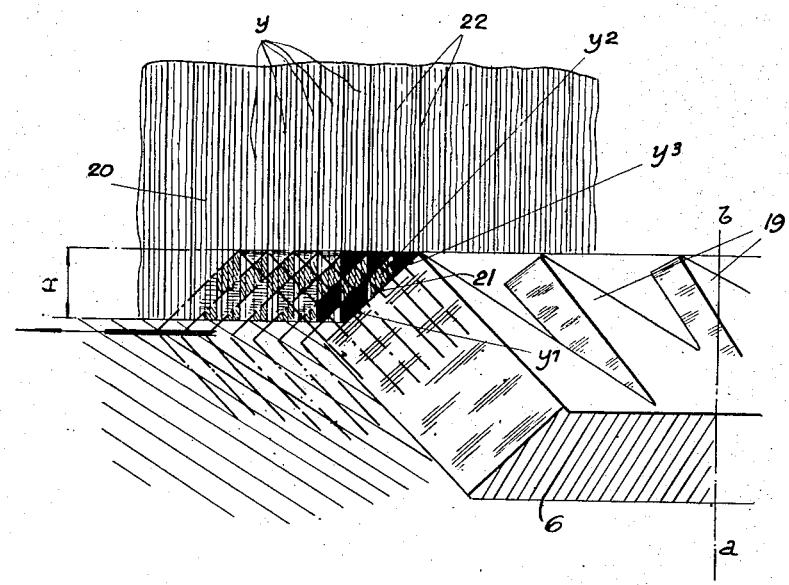
Fig. 6 is a sectional elevation which illustrates the action of the tools according to the invention on a piece of wood.

Fig. 6 illustrates the work of the tools according to the invention. 19 are the teeth of a milling cutter, for example according to Figs. 1 and 2. Said teeth engage the piece of wood 20 transversely along a plane 21, forming a working plane positioned at an angle of about 45° between the lengthwise direction of the piece 20 and the cutting plane transversely through the piece 20 across the grain thereof. The cutting plane (see Figure 2 and Figure 6) given by the inclination of the edges of the teeth, depends only on that inclination; the working plane depends, on the contrary, on the position of these teeth with respect to that of the wood to be cut. It lies at an angle to the cutting plane transversely through the material; this angulation between the working plane 21 and the cutting plane lies in the plane of the height $x$ represented on Figure 6 and explained further.

The cutting edges of each annular row and of a plurality of successive rows are inclined about 45° to 52° upward and inward toward axis $a$—$b$ tangent to a cone or cones of such base angle and generate and define, with the rotation of the tool, a truncated cone or frusto-conical surface, the base-angles of which are the same and may be about 45°. Thus, there are a plurality of radially oblique concentric circular rows of teeth which are vertically staggered with respect to one another, the cutting edge of each tooth defining a frusto-conical surface the inclination of which varies with the position of the tooth and lies at an angle to the working plane of the tool. The fibres of the wood are thus successively engaged over very small fractions of their length so that they are cut into very small fragments. When, as in the examples of Figs. 1 to 4, use is made of a plurality of rows of teeth located at different levels staggered vertically relatively to one another, not only do the various rows of teeth engage the fibres of the wood successively, but furthermore, in each row of teeth, the length of fibre corresponding to the cutting height of said row of teeth is reduced to fragments, owing to the fact that the teeth gradually engage said fibres due to their inclination relatively to same. In this figure, $x$ designates the height of cut of the cutter and the lines 22 divide the wood arbitrarily into units of cutting feed $y$. It will thus be seen that, if a cutter with three rows of teeth is used, the height $x$ is divided into cutting portions $y^1$, $y^2$, $y^3$ owing to the inclination of the teeth relatively to the fibres.

Figure 7:
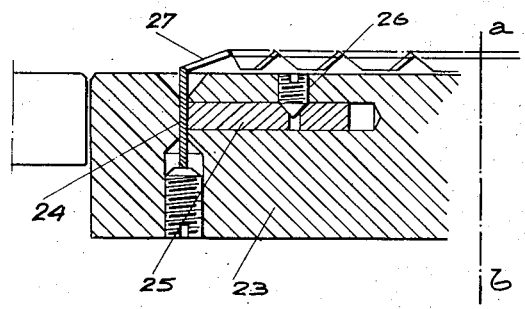
Fig. 7 shows a partial vertical section of a modification.

In Fig. 7, the tool comprises a block 23 in which a saw-blade 24 is clamped by means of clamps 25 and studs 26 with tapered ends. In this case, the teeth 27 of the saw are bent over inwardly at an obtuse angle towards the axis of rotation $a$—$b$ of the tool, and preferably at a very acute angle towards and relative to the plane extent or top surface of the block 23. This tool is particularly advantageous for reducing to fragments woody vegetable substances such as straw, papyrus, etc.

Figure 8:
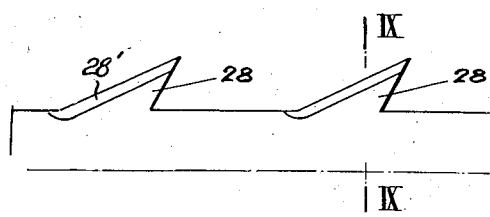
Fig. 8 shows a tooth profile according to another modification.
Figure 9:
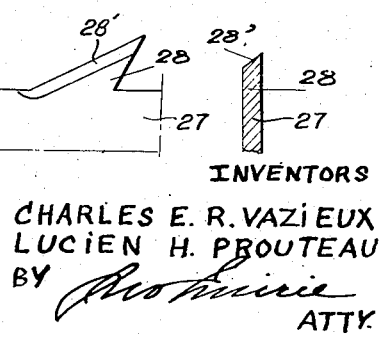
Fig. 9 is a section along the line IX—IX of Fig. 8.

Fig. 8 shows partially the profile of the teeth 28 of a cutter corresponding to Fig. 7. Said teeth, which are directed towards the axis of rotation are furthermore laterally inclined as at 28', as shown in particular in Fig. 9.

The invention thus makes it possible literally to cut fibrous substances into very small fragments and, furthermore, the output is very high since, as each tooth only has to effect a very small amount of work, the force required for the fragmentation is uniformly distributed over all the teeth of the various rows, so that an optimum distribution of the work is obtained over all the parts of all the teeth of the cutter.

The tools according to the invention can be made in extremely varied shapes according to the substances to be worked. The cutters may comprise one, two or any desired number of rows of teeth. The inclination of the working plane, of the tooth plane and of the teeth of each row relatively to the cutting plane and the general inclination of the successive rows of teeth which are staggered vertically relatively to one another and relatively to the cutting plane, these inclinations being equal or different, may vary according to the nature of the substances to be reduced to fragments, the pressure with which such substances are engaged by the fragmentation tools, and also the speed of rotation of the tools and the power of the drive.

Figure 10:
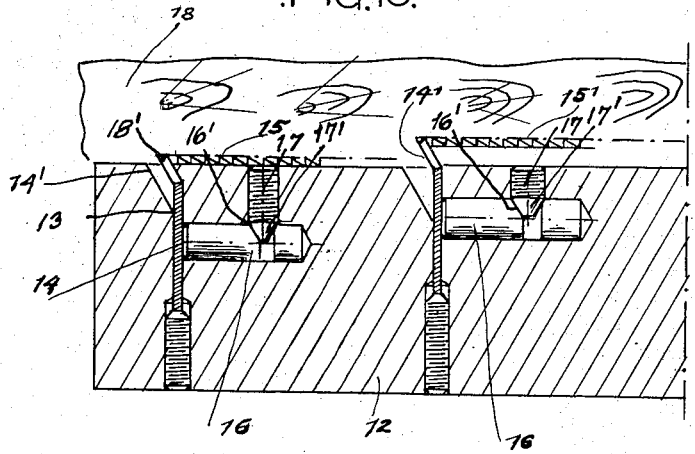
Figure 10 is a partial vertical section of a block supporting plural concentric band-saws, staggered vertically with respect to one another.

In the case of a tool comprising a band-saw according to Fig. 5, it would also be possible to provide a succession of concentric band-saws staggered vertically with respect to one another, thereby forming a tool with stages of teeth (Figure 10) similar to the cutters hereinbefore described.

The fragmentation effected according to the method of the invention by means of tools having an oblique plane of work relatively to the cutting plane makes it possible to work green woods and even wood from freshly cut down trees, still containing a very large proportion of moisture. Since the fibres are engaged by the fragmentation tools in a state of maximum expansion, the fragments formed further contract or shrink to a very great extent after drying, thereby enabling an extremely fine product to be obtained.

Figure 11:
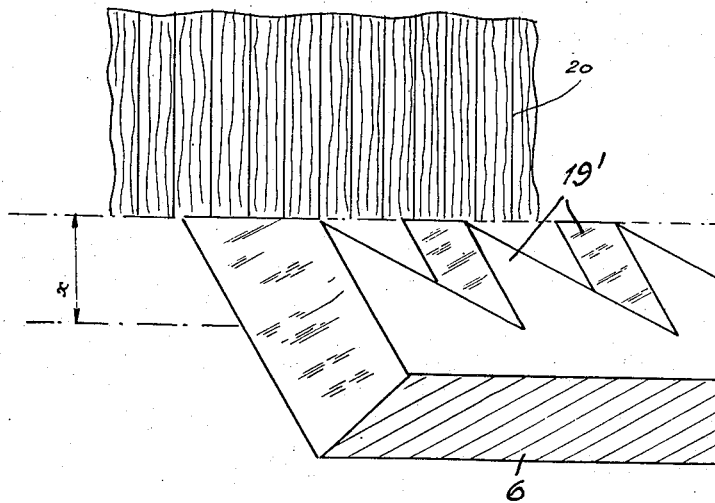
Figure 11 is a sectional elevation which illustrates the action of the upper part of the teeth as they first engage the wood to be cut.

The obliquity of the working plane relatively to the cutting plane may be the reverse of that shown by way of example in the drawings, in that case (Figure 11), the upper part of the teeth first engages the wood to be cut.

Owing to the fact that the operating tools are preferably driven at high speed, a very appreciable heating occurs at the instant when fragmentation takes place, which favours evaporation by adding itself to the heating already produced by the friction of the wood against the cutter supporting plate during the rotation of same.

The reduced product may be subjected to a complementary drying immediately after fragmentation, in order to ensure complete evaporation of the moisture.

Although certain specific embodiments of the invention have been shown and described, it is obvious that many modifications thereof are possible. The invention, therefore, is not to be restricted except in so far as is necessitated by the prior art and by the spirit of the appended claims.

We claim:

1. A rotary tool for the fragmentation of fibrous substances, which comprises a plurality of radially oblique, concentric, circular rows of teeth which are vertically staggered with respect to one another, the cutting edge of each tooth defining on rotation a frusto-conical surface the inclination of which varies with the position of the tooth in each row of teeth and lies at an angle to the cutting plane of the tooth.

2. A rotary tool for the fragmentation of fibrous substances, which comprises a plurality of radially oblique, concentric, circular rows of teeth which are vertically staggered with respect to one another, the cutting edge of each tooth defining on rotation a frusto-conical surface, the inclination of which varies with the position of the tooth in each row of teeth and lies at an angle to the cutting plane of the tool, the upper part of each tooth first engaging the wood to be cut so as to reverse the obliquity of the working plane relative to the cutting plane.

3. A rotary tool for the fragmentation of fibrous substances, which comprises a body portion, surrounded by one or more radially oblique concentric circular rows of teeth, the outer cutting edge of each tooth being inclined relatively to said body and the cutting plane of the teeth of each row being parallel with the body and generating on rotation of the tool, a truncated cone, the base angle of which is between 45° and 52°, constituting the working plane, to engage and cut the substance at points on lines parallel to a circular path through the cutting edges and said cone and at said angle to the cutting plane transversely through the substance.

4. A rotary tool according to claim 3, wherein the teeth are cut integral with the body portion of the tool.

5. A rotary tool according to claim 3, wherein the body portion is formed by a plate, segment-shaped elements are removably fixed to said plate, and a number of teeth are formed on each of said segments.

6. A rotary tool according to claim 3, wherein the teeth are bent over in the direction of the shaft and the teeth of successive rows are disposed at different levels.

7. A rotary tool according to claim 3, wherein the teeth are bent over in the direction of the shaft and the teeth of successive rows are disposed at different levels and at a lateral bevel formed on said teeth.

8. A rotary tool for the fragmentation of fibrous substances, which comprises a plurality of radially oblique, concentric, circular rows of teeth which are vertically staggered with respect to one another, the cutting edge of each tooth defining on rotation, a frusto-conical surface, the inclination of which varies with the position of the tooth and lies at an angle to the working plane of the tool.

9. A rotary tool for the fragmentation of fibrous substances, which comprises a plurality of radially oblique, concentric, circular rows of teeth which are vertically staggered with respect to one another, the cutting edge of each tooth generating on rotation, a frusto-conical surface the inclination of which constitutes the working plane thereof and lies at an angle to the cutting plane of the tool, said rows of teeth defining a frusto-conical surface the inclination of which is the same as that of the teeth of each row.

10. A rotary tool for the fragmentation of fibrous substances, which comprises a plurality of radially oblique, concentric, circular rows of teeth which are vertically staggered with respect to one another, said teeth having their outer cutting edges inclined outwardly so as to generate on rotation of the tool, a cone the base angle of which is substantially 45° and constitutes the working angle and plane of the tool and lies at such angle to the cutting plane of the row of teeth, said rows of teeth defining a frusto-conical surface the inclination of which is opposite to that of the teeth of each row.

11. A rotary fragmenting tool which comprises a block, at least one saw band arranged concentrically in said block, the teeth of said band being outwardly inclined, and means for clamping said band in the block.

12. A rotary tool which comprises a block, at least one saw band being arranged in the block, clamping means for holding said band, and teeth of said saw band being bent over in the direction of the axis of rotation of the tool.

CHARLES EUGÈNE ROGER VAZIEUX.
LUCIEN HIPPOLYTE PROUTEAU.

REFERENCES CITED

The following references are of record in the file of this patent:

UNITED STATES PATENTS

| Number | Name | Date |
|---|---|---|
| Re. 18,935 | Tomashek | Sept. 5, 1933 |
| 17,985 | Sanford | Aug. 11, 1857 |
| 103,968 | Bliss et al. | June 7, 1870 |
| 112,733 | Perkins | Mar. 14, 1871 |
| 200,540 | Jeffers | Feb. 19, 1878 |
| 203,928 | McIntyre | May 21, 1878 |
| 211,134 | Cornell | Jan. 7, 1879 |
| 218,953 | Forbes | Aug. 26, 1879 |
| 230,471 | Enos | July 27, 1880 |
| 233,105 | Lane | Oct. 12, 1880 |
| 236,856 | Stewart | Jan. 18, 1881 |
| 239,807 | Lane | Apr. 5, 1881 |
| 349,992 | Goodwin | Sept. 28, 1886 |
| 350,358 | Goodwin | Oct. 5, 1886 |
| 892,808 | Carr | July 7, 1908 |
| 964,602 | Aldridge | July 19, 1910 |
| 1,046,130 | Widdis | Dec. 3, 1912 |
| 1,055,587 | Wilson | Mar. 11, 1913 |
| 1,102,789 | Ogden | July 7, 1914 |
| 1,207,069 | Park | Dec. 5, 1916 |
| 1,275,078 | Nesbitt | Aug. 6, 1918 |
| 1,691,983 | Miller | Nov. 20, 1928 |
| 1,778,860 | Lindenfelser | Oct. 21, 1930 |
| 1,987,946 | Shaw | Jan. 15, 1935 |
| 2,004,367 | Brown | June 11, 1935 |
| 2,127,861 | Gandriaut | Aug. 23, 1938 |
| 2,135,754 | Jones | Nov. 8, 1938 |
| 2,211,655 | Hilgers | Aug. 13, 1940 |
| 2,281,264 | Bruno | Apr. 28, 1942 |
| 2,431,204 | Dulmage | Nov. 18, 1947 |